United States Patent [19]
Sorokin et al.

[11] Patent Number: 5,877,389
[45] Date of Patent: Mar. 2, 1999

[54] PROCESS FOR THE OXIDATIVE DECOMPOSITION OF ORGANIC COMPOUNDS PRESENT IN AQUEOUS EFFLUENTS

[75] Inventors: Alexander Sorokin, Toulouse; Bernard Meunier, Castanet; Jean-Louis Seris, Jurancon, all of France

[73] Assignee: Elf Aquitaine, Courbevoie, France

[21] Appl. No.: 696,839

[22] PCT Filed: Feb. 23, 1995

[86] PCT No.: PCT/FR95/00212

§ 371 Date: Aug. 28, 1996

§ 102(e) Date: Aug. 28, 1996

[87] PCT Pub. No.: WO95/23118

PCT Pub. Date: Aug. 31, 1995

[30] Foreign Application Priority Data

Feb. 28, 1994 [FR] France .................................. 94 02276

[51] Int. Cl.$^6$ .................................. A62D 3/00; C02F 1/72
[52] U.S. Cl. .................................. 588/205; 588/206; 588/207; 210/759; 210/908
[58] Field of Search .................................. 588/205, 206, 588/207, 215, 218; 210/759, 908, 909

[56] References Cited

U.S. PATENT DOCUMENTS

| | | | |
|---|---|---|---|
| 3,290,383 | 12/1966 | Pflugfelder | 260/609 |
| 5,120,453 | 6/1992 | Frame et al. | 210/759 |
| 5,141,911 | 8/1992 | Meunier et al. | 502/159 |
| 5,156,748 | 10/1992 | Meunier et al. | 210/759 |
| 5,345,032 | 9/1994 | Marks et al. | 588/207 |
| 5,552,603 | 9/1996 | Yan | 210/763 |

FOREIGN PATENT DOCUMENTS

| | | |
|---|---|---|
| 032419 | 1/1980 | European Pat. Off. . |
| 262057 | 3/1988 | European Pat. Off. . |
| 417407 | 9/1989 | European Pat. Off. . |
| 572698 | 12/1993 | European Pat. Off. . |
| 79/158087 | 6/1981 | Japan . |

*Primary Examiner*—Gary P. Straub
*Attorney, Agent, or Firm*—Oblon, Spivak, McClelland, Maier & Neustadt, P.C.

[57] ABSTRACT

A method for oxidatively breaking down organic compounds that have low biodegradability and are difficult to oxidize chemically in aqueous effluents, by using a water-soluble peroxide oxidant in the presence of a water-soluble iron or manganese metallophthalocyanine immobilized on an ionic resin consisting of a cross-linked insoluble copolymer derived from a vinylaromatic monomer comprising cationic or anionic groups. The method is particularly suitable for oxidatively decomposing polyhalogenophenols and halogenated hydrocarbons.

15 Claims, 3 Drawing Sheets

(1) EXAMPLE 1
(2) COMPARATIVE TEST 2
(3) COMPARATIVE TEST 3

5

6

7

8

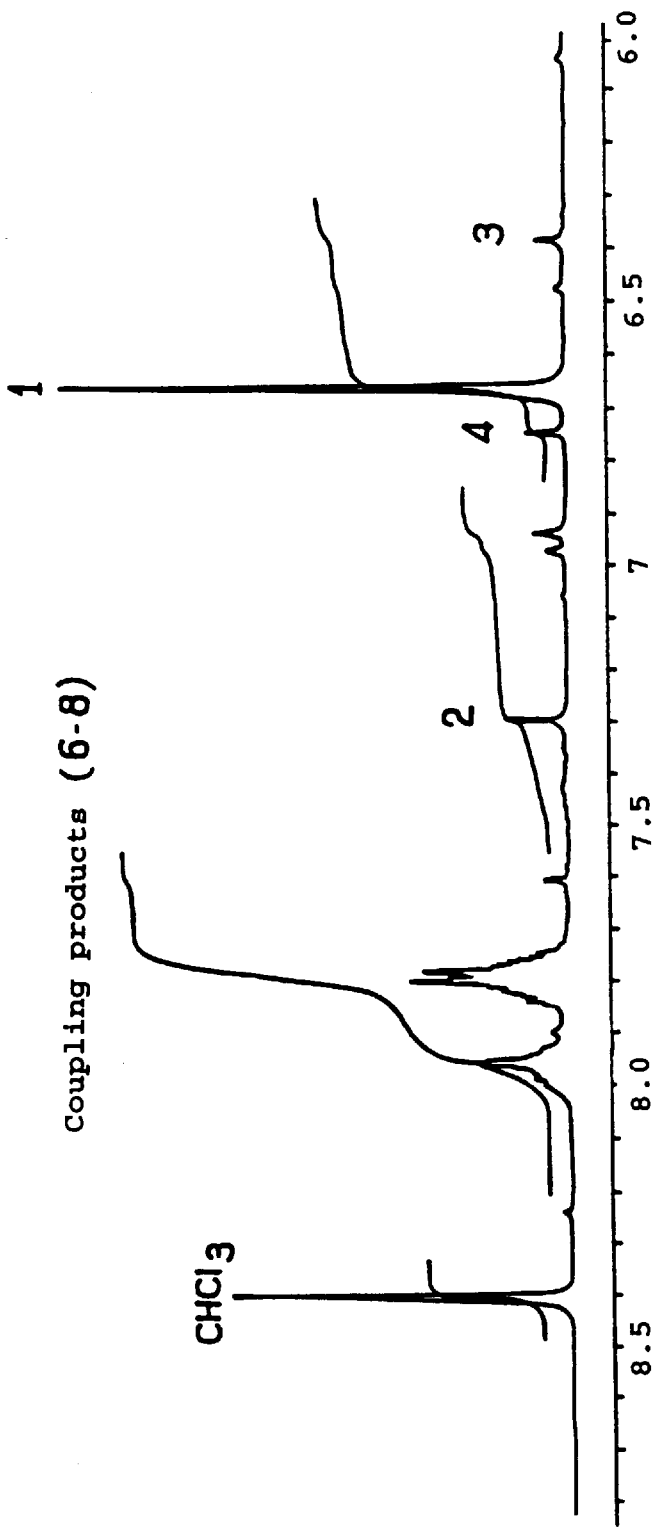
FIG._3

PROCESS FOR THE OXIDATIVE DECOMPOSITION OF ORGANIC COMPOUNDS PRESENT IN AQUEOUS EFFLUENTS

A subject of the present invention is a catalytic process for the oxidative degradation of organic compounds which are difficult to oxidize present in aqueous effluents.

BACKGROUND OF THE INVENTION

Protection of the environment, a major preoccupation of our age, involves the decontamination of aqueous effluents from the chemical and related industries which contain organic compounds which are, to a greater or lesser extent, toxic to flora and fauna and to man.

For a long time, reliance has been placed on the natural degradation of chemical compounds under the effect of microorganisms to solve the problem posed by the presence of these compounds. Biodegradation often proves to be insufficient when the amount of effluent becomes too large and/or when aqueous discharges contain compounds which are not or only slightly biodegradable, by oxidation in particular. This is the reason why it has become essential to make available to industry processes which make possible the removal or degradation of the toxic compounds present in aqueous effluents to compounds which are non-toxic and/or readily biodegradable, before discharging the said effluents into water courses.

Many processes have been provided for this purpose. Thus, the oxidative degradation of organic compounds is a means which is often recommended for the treatment of aqueous effluents. A description has been given, in French Patent No. 88 09169, published under No. 2,633,925, of a process for the oxidative degradation of benzyl alcohols and of organic compounds related to benzyl alcohols, which comprises the treatment of the said compounds with a water-soluble peroxide oxidizing agent, such as hydrogen peroxide and alkali metal persulphates, in the presence of an iron or manganese chelate derived from a porphyrin and, if appropriate, of a nitrogenous base, such as pyridine or imidazole or their derivatives.

A description has been given, in French Patent No. 89 16690, published under No. 2,655,774, of an analogous process for the oxidative degradation of aromatic compounds which are difficult to oxidize, in particular of chlorinated derivatives, such as 2,4,6-trichlorophenol, by means of water-soluble peroxides in the presence of water-soluble metallomesotetraphenylporphyrins derived more particularly from iron and manganese. Recourse to metalloporphyrins which have been rendered water-soluble by the presence of ionic substituents (sulpho or quaternary ammonium groups) makes it possible to increase the effectiveness of the catalyst but has the disadvantage of complicating, indeed of rendering impossible, the recovery of the catalyst, which contributes to increasing the cost of the process and to adding a pollutant to the treated effluent. In order to retain the advantage of the homogeneous-phase catalyst without having the disadvantages thereof, the suggestion has been made to attach the metalloporphyrins to ionic resins and in particular to resins containing guaternary ammonium groups, in the case of metalloporphyrins containing sulpho substituents. In this way, the supported metalloporphyrins can be easily recovered by simple filtration and recycled or else the effluents can simply be treated continuously on a supported catalyst bed. Provision has been made for the use, as catalytic resin, of polyvinylpyridinium or of copolymers of styrene containing quaternary ammonium groups, such as styrene/chloromethylstyrene copolymers quaternized by a trialkylamine and crosslinked. However, the best catalytic activities were obtained with potassium monopersulphate as oxidizing agent and by using metalloporphyrins attached to resins of polyvinylpyridinium type (cf. G. Labat and B. Meunier, C. R. Acad. Sci. Paris, vol. 311 (1990), p. 625). Oxidation of trichlorophenol is slower with hydrogen peroxide than with an alkali metal monopersulphate (cf. G. Labat et al., Angew, Chem. Int. Ed. Engl., vol. 29 (1990), p. 1471).

Provision has also been made for the replacement of metalloporphyrins, products which are particularly expensive, by less expensive water-soluble metallophthalocyanines, for the oxidation of 3,4-dimethoxybenzyl alcohol by hydrogen peroxide (cf. W. Zhu et al., J. Molecular Catalysis, vol. 78 (1993), p. 367–378). The metallophthalocyanines derived from iron and manganese have proved to be the most active; the use of cationic latexes composed of insoluble colloid particles of crosslinked styrene/chloromethylstyrene copolymers quaternized by triethylamine with a mean diameter of 50 nm has not had a noticeable effect on the kinetics of the oxidation.

SUMMARY OF THE INVENTION

The problem is therefore posed of carrying out the oxidative degradation, both as economically as possible and while satisfying the objectives of protecting the environment, of toxic organic compounds which are only slightly biodegradable and/or particularly difficult to oxidize. The solution to such a problem involves the use of oxidizing agents which do not give rise to contaminating by-products and of catalysts which are less expensive and more efficient than metalloporphyrins and which are easy to recycle. The present invention specifically provides for the achievement of these different objectives.

BRIEF DESCRIPTION OF THE DRAWING

FIGS. 2 and 3 show oxidization products produced using the instant process.

DESCRIPTION OF THE PREFERRED EMBODIMENTS

Figure 1:
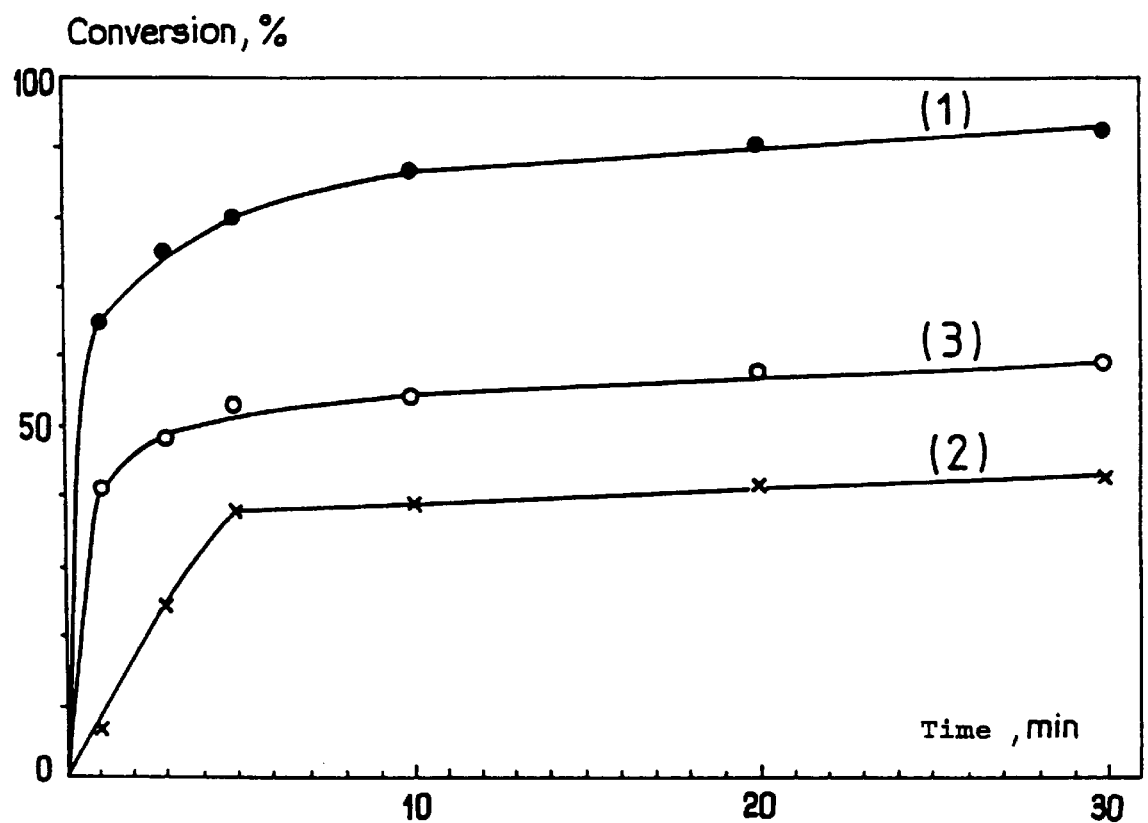
FIG. 1 shows conversion of trichlorophenol using various resin supported catalysts.

More particularly, a subject of the present invention is a process for the oxidative degradation of organic compounds which are only slightly biodegradable and/or difficult to oxidize chemically present in aqueous effluents by means of a water-soluble peroxide oxidizing agent in the presence of a supported water-soluble metallophthalocyanine as catalyst, characterized in that the catalyst is an iron or manganese phthalocyanine immobilized on an ionic resin composed of a crosslinked insoluble copolymer derived from a vinylaromatic monomer containing cationic or anionic groups and the oxidizing agent is chosen from alkali metal salts of persulphuric acid, such as sodium and potassium monopersulphates, and hydrogen peroxide, the latter being particularly well suited.

Within the meaning of the present invention, "compound which is difficult to oxidize chemically" more specifically denotes an organic compound having an oxidation/reduction potential greater than or equal to 1.45 volts (reference: Ag/AgCl). It has been unexpectedly found, with respect to the state of the art, that, in the case of the abovementioned organic compounds, the attachment of the metallophthalocyanine to an ionic resin with a vinylaromatic skeleton makes it possible to increase the catalytic activity thereof. Moreover, the catalytic activity of metallophthalocyanines immobilized on an ionic resin of this type proves to be greater than that of metallophthalocyanines deposited on a resin of polyvinylpyridine type, in contrast to what is reported for metalloporphyrins. The process according to the invention therefore makes it possible to degrade, under good conditions, organic compounds which are particularly resistant to biodegradation and to chemical oxidation, by using oxidizing agents which are non-polluting and in particular hydrogen peroxide, catalysts which are less expensive and recyclable and ionic resins which are already widely used in water treatment due to their harmlessness.

As a result of the synergy of the metallophthalocyanides with their support in the presence of hydrogen peroxide or of an alkali metal persulphate, the oxidation of these compounds is more forceful. In fact, in contrast to metalloporphyrins, it results in the opening of the aromatic rings. In the case of trichlorophenol, oxidation is not limited to the production of trichlorophenol but results in the production of dicarboxylic acids.

In the catalysts used in accordance with the present invention, the attachment of the metallophthalocyanine to the resin is provided by interaction between the ionic groups of the resin and the opposing ionic groups situated on the periphery of the macrocyclic ligand of the metallophthalocyanine.

The water-soluble iron or manganese phthalocyanines used as catalyst in the process according to the invention are known products. Their solubility in water results from the presence, on the phthalocyanine residue, of hydrophilic groups, such as acid groups or quaternary ammonium groups. Mention may be made, among the acid groups, of hydroxycarbonyl and sulphonic acid groups, the latter being preferred, and, among the quaternary ammonium groups, of alkylpyridinium radicals and methyltrialkylammonium radicals. More specifically, recourse may be had to metallophthalocyanines of general formula:

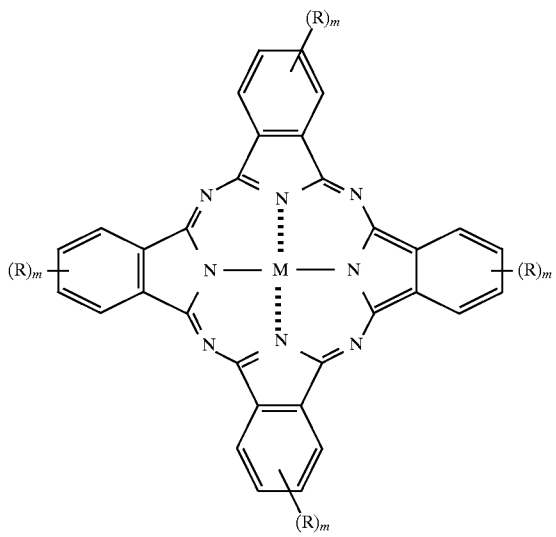

in which:
M represents an iron or manganese atom;
R represents:
a sulphonic acid group (—SO$_3$H);
a quaternary ammonium group of general formula —CH$_2$—(CH$_2$)$_n$—N$^+$ (R$_1$R$_2$R$_3$) X$^-$, in which: n is 0 or an integer from 1 to 4; R$_1$, R$_2$ and R$_3$ represent lower alkyl radicals (methyl, ethyl, propyl or butyl); and X represents a halogen atom (chlorine, bromine or iodine);
a pyridinium radical;
a lower alkyl group;
an aromatic residue, such as the phenyl, tolyl and xylyl radicals;
m is 0 or an integer from 1 to 4,
with the restriction that at least one of the m indices is equal to 1 and that at least one of the R substituents represents one of the abovementioned hydrophillic radicals.

Except when otherwise indicated, lower alkyl radical will subsequently denote any alkyl radical containing from 1 to 4 carbon atoms.

Use may also be made of iron or cobalt phthalocyanines derived from quaternized tetraazaphthalocyanines, such as those described by C. C. Leznoff in the publication Phthalocyanines: Properties and Applications, VCH Publishers Inc. (1989).

Mention may be made, as specific examples of water-soluble metallophthalocyanines, without implied limitation, of: iron and manganese monosulphophthalocyanines; iron and manganese disulphophthalocyanines; iron and manganese trisulphophthalocyanines and tetrasulphophthalocyanines obtained by sulphonation of metallophthalocyanines by fuming sulphuric acid or from 4-sulphophthalic acid; hydroxycarbonylphthalocyanines can be prepared by the action of trichloroacetic acid on metallophthalocyanines. Mention may be made, among metallophthalocyanines containing quaternary ammonium groups, of the iodide of iron 2,9,16,23-tetrakis(methyl, diethyl, propylammonium) phthalocyanine and the methylpyridinium iodide of iron tetraazaphthalocyanine. It is preferable to resort to iron and manganese sulphophthalocyanines.

The choice of the ion-exchange resin depends on the nature of the metallophthalocyanine used as catalyst. To immobilize a metallophthalocyanine containing acidic hydrophilic groups, recourse is had to a cationic vinylaromatic resin and to an anionic resin for attaching a metallophthalocyanine containing a cationic hydrophilic group. More specifically, recourse is had to an ion-exchange resin exhibiting a plurality of repeat units of general formula:

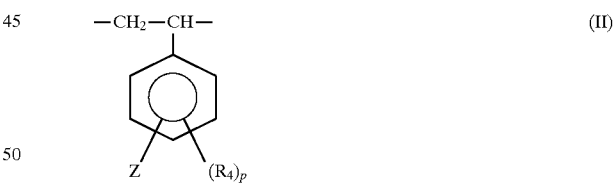

in which: Z represents a cationic or anionic radical; R$_4$ a lower alkyl radical; and p is 0, 1 or 2. In formula (II), Z more particularly represents a sulphonic acid group or cationic group of general formula:

in which n, R$_1$, R$_2$, R$_3$ and X have the definition given above for the formula (I).

In the ion-exchange resin, the repeat units of formula (II) are associated with units derived from vinylaromatic monomers which do not possess ionic groups and, preferably, with a small amount of units derived from a crosslinking monomer containing at least two polymerizable ethylenic groups, such as the vinyl or aryl groups. Mention may be made, as examples of repeat units associated with the units of formula (II), of those corresponding to the general formula:

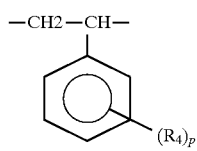

(IV)

in which $R_4$ and p have the meaning given for the formula (II).

Mention may be made, as specific examples of monomers which can be used for producing the units of formula (IV), without implied limitation, of styrene and α-methylstyrene. Divinylbenzene, diallyl phthalate and acrylates and methacrylates of aliphatic diols, such as ethylene glycol, appear among the crosslinking polyethylenic monomers which may preferably be associated with the monomers containing ionic groups.

The composition of the ionic resins used for the immobilization of the metallophthalocyanines can vary within wide limits. The proportion of repeat units containing ionic groups depends on the number of ionic groups carried by the repeat unit under consideration. In general, the number of repeat units carrying ionic groups is calculated so that the dry resin contains from 1 to 10 milliequivalents of ionic group per gram. A number of crosslinking repeat units representing between 0.1 and 25 mol % and preferably between 0.5 and 10 mol % of the total of the repeat units present in the polymer chain is generally sufficient to confer good mechanical properties on the resin used.

The mean particle diameter of the resin can vary within wide limits. However, in order to obtain the highest possible catalytic activity, recourse is had to resins exhibiting a mean particle diameter within a range from 80 to 1000 μm and preferably from 200 to 500 μm.

The catalyst composed of the metallophthalocyanine immobilized on the polymer support can be obtained by bringing an appropriate ionic resin into contact, in a known way, with an aqueous solution of the metallophthalocyanine, if appropriate in the presence of an inert organic solvent; recourse may be had, for example, to acetonitrile. The amounts of phthalocyanine and of resin used depend on their respective contents of ionic groups. They are generally chosen in order to ensure the presence of an amount of phthalocyanine close to the maximum theoretical amount which can be attached by the resin.

Mention may be made, as compounds which are only slightly biodegradable and which are very difficult to oxidize chemically, of polycyclic aromatic hydrocarbons; halogenated mono- or polycyclic aromatic hydrocarbons; halogenated aliphatic hydrocarbons (haloalkanes); halogenated arylaliphatic hydrocarbons; or halophenols. Mention may be made, as specific examples of compounds which come under the process according to the invention, without implied limitation, of aromatic hydrocarbons such as pyrene, benzo[a]pyrene, anthracene, phenanthrene, benzanthracene or biphenyl, haloarylalkanes such as 1,1-bis (4-chlorophenyl)-2,2,2-trichloroethane (DDT), haloalkanes or cycloalkanes such as 1,2,3,4,5,6-hexachlorocyclohexane, halogenated aromatic hydrocarbons such as the polychlorobiphenyls 3,4,3',4'-tetrachlorobiphenyl and 2,4,5,2',4',5'-hexachlorobiphenyl or halophenols such as the polychlorophenols 2,4-dichlorophenol, 2,4,5-trichlorophenol, 2,4,6-trichlorophenol, pentachlorophenol, 4,5-dichloroguaiacol or 4,5,6-trichloroguaiacol. The process according to the invention is very particularly well suited to the oxidative degradation of aqueous effluents containing polychlorophenols originating from the bleaching of paper pulp by chlorination.

The temperature at which the oxidation of the organic compounds is carried out can vary within wide limits, depending on the nature of the substrate and/or of the oxidizing agent. Generally, this temperature can be between 10° C. and 100° C.; in general, it is sufficient to carry out the oxidation at room temperature. The amount of catalyst, expressed in molar equivalents of metallophthalocyanine, varies according to the nature of the substrate subjected to the oxidation. Amounts of catalyst contributing from 0.01 to 5 molar equivalents of metallophthalocyanine per 100 mol of substrate to be oxidized are well suited.

Although the reaction is preferably carried out in aqueous medium, an inert solvent, preferably miscible with water, can be used if appropriate when the substrate to be oxidized has little solubility in water. It is possible, for example, to carry out the reaction in the presence of acetonitrile or of an alcohol, such as methanol or ethanol. The pH of the reaction mixture depends on the nature of the metallophthalocyanine and on that of the oxidizing agent. Thus, when recourse is had to a catalyst based on Fe-phthalocyanine, the pH is preferably between 2 and 7 whereas, in the presence of an Mn-phthalocyanine, the pH is preferably between 3 and 8.5. The appropriate pH is obtained by resorting to a suitable buffer system.

The amount of oxidizing agent used to degrade the organic compound is not critical and varies according to the nature of this compound and that of the oxidizing agent and according to the reaction conditions (temperature, amount of catalyst, for example). It is within the scope of the person skilled in the art to determine this amount in each specific case. An amount of oxidizing agent of between 1 and 5 molar equivalents with respect to the organic compound to be oxidized is generally well suited.

The following examples, given without implied limitation, illustrate the invention and show how it can be put into practice. In these examples, the following abbreviations have been used:

FePcS denotes the sodium salt of iron 4,4',4",4'''-tetrasulphonatophthalocyanine;

MnPcS denotes the sodium salt of manganese 4,4',4",4'''-tetrasulphonatophthalocyanine;

CoPcS denotes the sodium salt of cobalt 4,4',4",4'''-tetrasulphonatophthalocyanine;

Amb denotes a cationic resin known under the trade name Amberlite IRA 900 and composed of a styrene/chloromethylstyrene copolymer crosslinked by divinylbenzene and quaternized by trimethylamine and containing, per gram of dry resin, 3 to 5 milliequivalents of quaternary ammonium groups;

FePcS-Amb denotes the catalyst obtained by attaching FePcS to Amberlite IRA 900 resin MnPcS-Amb denotes the catalyst obtained by attaching MnPcS to Amberlite IRA 900 resin;

PVP(25) denotes a vinylpyridine/divinylbenzene copolymer containing 25 mol % of divinylbenzene;

FePcS-PVP(25) denotes the catalyst obtained by attaching FePcS to the vinylpyridine/divinylbenzene copolymer containing 25 mol % of divinylbenzene;

PVPMe$^+$ (25) denotes a vinylmethylpyridinium/divinylbenzene copolymer containing 25 mol % of divinylbenzene;

FePcS-PVPMe$^+$ (25) denotes the catalyst obtained by attaching FePcS to the vinylmethylpyridinium/divinylbenzene copolymer containing 25 mol % of divinylbenzene;

PVP(2) and PVPMe$^+$ (2) denote vinylpyridine/divinylbenzene and vinylmethylpyridinium/ divinylbenzene copolymers containing 2 mol % of divinylbenzene;

FePcS-PVP(2) and FePcS-PVPMe$^+$ (2) denote the catalyst obtained by attaching FePcS to the vinylpyridine/divinylbenzene copolymer containing 2 mol % of divinylbenzene and the catalyst obtained by attaching FePcS to the vinylmethylpyridinium/divinylbenzene copolymer containing 2 mol % of divinylbenzene;

MnPcS-PVP(2) and MnPcS-PVPMe$^+$ (2) denote the catalysts obtained by attaching MnPcS to the vinylpyridine/divinylbenzene and vinylmethylpyridinium/divinylbenzene copolymers containing 2 mol % of divinylbenzene.

The catalysts used in the examples were obtained according to the procedures described below.

Preparation of FePcS-Amb 1 g of a cationic resin having a mean particle diameter of 500 μm, sold under the trade name Amberlite IRA 900 by the company Ega Chemie, is added to a solution of 10 mg (8.76 μmol) of FePcS in a mixture of 20 ml of water and 20 ml of acetonitrile. The complex remaining in solution is quantitatively determined by visible spectrometry. After stirring slowly for 48 h, the impregnated resin is recovered by filtration and washed with a water/acetonitrile (3 parts by volume per 1 part) mixture. No trace of FePcS is detected in the wash liquors. The resin is then dried in air at 65° C. for 65 h. This type of supported catalyst contains 6.75 μmol (7.7 mg) of FePcS per gram of support. The metallophthalocyanine content is determined by spectrophotometric quantitative determination of the amount of complex which has not been absorbed by the support. This catalyst will be denoted hereinbelow by FePcS-Amb-1.

A second supported catalyst was prepared after having replaced the Ega Chemie resin by a resin sold under the same trade name by the company Aldrich and exhibiting a mean particle diameter of 500 μm. The supported catalyst obtained contains 4.3 μmol (4.9 mg) of metallophthalocyanine. This catalyst will be denoted hereinbelow by FePcS-Amb-2.

Preparation of FePcS-PVP(25)

The PVP is prepared according to the method described in French Patent Application No. 89 10761, by basic treatment of a 25% crosslinked polyvinylpyridinium resin with a mean particle diameter of 500 μm. 1 g of the PVP(25) thus obtained is added to a solution of 12 mg (10.7 μmol) of FePcS in 50 ml of water. After stirring slowly for 14 h, the impregnated polymer is filtered off and is then washed with a mixture of 3 volumes of water with 1 volume of acetonitrile. The complex is not released into the washing mixture. Drying is carried out for 65 h at 65° C. The metallophthalocyanine content of the catalyst thus obtained is 1.25 μmol (1.4 mg) per gram of impregnated polymer.

Preparation of FePcS-PVPMe$^+$ (25)

This type of catalyst is prepared from the FePcS-PVP (25) catalyst obtained above. To do this, the pyridine residues not involved in coordination with the metal of the complex are methylated, using methyl tosylate, according to the method of S. Campestrini and B. Meunier described in Inorganic Chemistry, 1992, vol. 31, p. 1999. The FePcS content of the catalyst thus obtained is 1.06 μmol (1.2 mg) per gram of modified polymer.

Preparation of FePcS-PVP(2)

1 g of polyvinylpyridine, prepared by treatment in basic medium of 2% crosslinked polyvinylmethylpyridinium with a particle diameter of between 87 and 174 μm, is added to 13.4 mg (11.9 μmol) of FePcS in solution in a water/acetonitrile (20 ml/20 ml) mixture. After stirring slowly for 77 h, the impregnated polymer is filtered off, then washed with a water/acetonitrile (3 volumes per one volume) mixture and dried in air for 6 h at 65° C. The FePcS content of the catalyst thus obtained is 6.2 μmol (7.1 mg) per gram of modified polymer.

Preparation of FePcS-PVPMe$^+$ (2)

This type of catalyst is prepared from the FePcS-PVP (2) catalyst obtained above by methylation of the pyridine residues using methyl tosylate according to the method described above. The FePcS content of the catalyst thus obtained is 4.1 μmol (4.7 mg) per gram of modified polymer.

Preparation of MnPcS-PVP(2)

This preparation was carried out according to the procedure described above for FePcS. A catalyst was obtained, the MnPcS content of which is 6.7 μmol (7.6 mg) per gram of modified polymer.

Preparation of MnPcS-PVPMe$^+$ (2)

This catalyst was prepared by methylation of the non-coordinated pyridine sites of the catalyst obtained above according to the process described above for FePcS-PVPMe$^+$ (2); its MnPcS content is 3.6 μmol (4.1 mg) per gram of modified polymer.

General conditions used in the examples

Use was made, as peroxide oxidizing agents, of, on the one hand, hydrogen peroxide as a 35 weight % aqueous solution and, on the other hand, potassium monopersulphate in the form of its triple salt $2KHSO_5 \cdot KHSO_4 \cdot K_2SO_4$ (M=615). The reactions are monitored by high pressure liquid chromatography (HPLC) on a C18 reversed-phase column with a methanol/water (50 volume %) eluent with detection at 280 nm.

EXAMPLE 1

20 μmol of 2,4,6-trichlorophenol, in solution in 500 μl of acetonitrile, were oxidized at room temperature and under an air atmosphere with 100 μmol of hydrogen peroxide in the form of a solution of 10 μl at 35 weight % diluted in 500 μl of phosphate buffer at pH 7, in the presence of 30 mg of the FePcS-Amb-1 catalyst described above (i.e. 0.2 μmol of FePcS). During the first three minutes of reaction, the formation of 2,6-dichlorobenzoquinone is observed, the latter being identified by HPLC and VPC/mass (vapour phase chromatography/mass spectrometry coupling). This quinone is then rapidly converted to products of high molecular mass.

Comparative Test 1

By way of comparison, Example 1 was repeated but after having replaced the FePcS-Amb-1 catalyst by 500 μl of a 0.4 mmol per liter (i.e. 0.2 μmol) aqueous FePcS solution.

Comparative Tests 2 to 3

Example 1 was repeated but after having replaced the FePcS-Amb-1 catalyst by, respectively: 32 mg of catalyst FePcS-PVP(2) and 49 mg of catalyst FePcS-PVPMe$^+$ (2), i.e. 0.2 μmol of FePcS in all cases.

Comparative Test 4

Comparative Test 2 was repeated, after having replaced the FePcS-PVP(2) catalyst by 75 mg of catalyst MnPcS-PVPMe$^+$ (2), i.e. 0.2 μmol of MnPcS.

Comparative Test 5

Comparative Test 1 was repeated, after having replaced the FePcS catalyst by free CoPcS.

EXAMPLE 2

The procedure was as in Example 1 but in the presence of 3.7 mol % of FePcS with respect to the trichlorophenol (i.e. 111 mg of FePcS-Amb-1 catalyst or 0.74 µmol of FePcS).

EXAMPLES 2-1 and 2-2

The procedure was as in Example 2 but reusing the catalyst separated from the reaction mixture of Example 2 by filtration. This catalyst was once again separated from the reaction mixture of Example 2-1 and recycled in Example 2-2. No decrease in the rate of the reaction was observed.

EXAMPLE 3

Example 1 is repeated but in the absence of phosphate buffer; the pH of the reaction mixture is then 5.5.

EXAMPLE 4

The procedure was as in Example 1 but after having replaced the FePcS-Amb-1 catalyst by 13 mg of catalyst MnPcS-Amb, i.e. 0.2 µmol of MnPcS.

Comparative Test 6

The procedure was as in Comparative Test 1, after having replaced the FePcS by free MnPcS, the reaction mixture being maintained at pH 8.5 by a 0.05 mol/l borate buffer.

EXAMPLE 5

The procedure was carried out under the same conditions as in Example 1, after having replaced the hydrogen peroxide by 30.7 mg of potassium persulphate, in the form of its triple salt, in solution in 1000 µl of water (i.e. 100 µmol of $KHSO_5$) and added 500 µl of water (i.e. a reaction volume of 2 ml).

EXAMPLE 6

Example 5 was repeated but after having replaced the 500 µl of water by 500 µl of 0.5 mol/l phosphate buffer, in order to bring the pH of the mixture to 7.

EXAMPLE 6-1

The procedure was as in Example 6 but using, as catalyst, that recovered by filtration of the reaction product from Example 6.

EXAMPLE 7

2 µmol of benzo[a]pyrene, in the form of a 2 mmol/l solution in acetonitrile, were oxidized at room temperature and under an air atmosphere with 10 µmol of hydrogen peroxide (solution of 10 µl at 35 weight % diluted in 1000 µl of phosphate buffer at pH 7), in the presence of 4.7 mg of the FePcS-Amb-2 catalyst described above (i.e. 20 nmol of FePcS). The benzopyrene is oxidized to an orange product consisting of a mixture of three quinone isomers having the same mass spectrum (m/z at 282 ($M^-$, 100%), 254 ($M^+$–CO, 17.4%), 226 ($M^+$–2CO, 17.4%). After separation by liquid chromatography on alumina and comparison with the UV/visible spectra described by R. J. Lorentzen et al., Biochemistry, 1975, vol. 14, p. 3970, they were identified as being benzo[a]-pyrene6, 12-dione, benzo [a]pyrene-1, 6-dione and benzo [a]-pyrene3,6-dione.

EXAMPLE 8

Example 7 was repeated, everything being the same, moreover, but after having brought the FePcS-Amb-2 catalyst/benzo[a]pyrene molar ratio to 3.7% (17.4 mg of catalyst, representing 74 nmol of FePcS, were charged).

EXAMPLE 9

Example 7 was repeated, everything being the same, moreover, but after having replaced the hydrogen peroxide by $KHSO_5$; 3.1 mg of triple salt, i.e. 10 µmol of $KHSO_5$, in solution in 1000 µl of water were charged.

EXAMPLE 10

20 µmol of pentachlorophenol, in the form of a 40 mmol/l solution in acetonitrile (i.e. 500 µl of solution), were oxidized at room temperature and under an air atmosphere with 100 µmol of hydrogen peroxide (solution of 10 µl at 35 weight % of $H_2O_2$ diluted in 500 µl of phosphate buffer at pH 7), in the presence of 47 mg of the FePcS-Amb-2 catalyst described above (i.e. 0.2 µmol of FePcS). 500 µl of acetonitrile were added to ensure that the pentachlorophenol was completely dissolved.

EXAMPLE 11

The procedure was as in Example 10 but in the presence of 3.7 mol % of FePcS, i.e. 111 mg of FePcS-Amb-1 catalyst (0.74 µmol of FePcS).

EXAMPLE 12

Example 1 was repeated, the presence of acetonitrile being limited to the amount necessary to dissolve the trichlorophenol. For this, 200 nmol of 2,4,6-trichlorophenol (5 µl of a 40 mmol/l solution in acetonitrile) were oxidized at room temperature and under an air atmosphere with 1 µmol of 3.5 weight % hydrogen peroxide diluted in 0.5 ml of phosphate buffer at pH 7, in the presence of 3 mg of the FePcS-Amb-1 catalyst (i.e. 20 nmol of FePcS). 1.5 ml of water are added to the reaction mixture.

Comparative Tests 7 to 10

Test 7 was carried out in order to oxidize trichlorophenol in the presence of a complex of Fe(III) with mesotetra(para-sulphonatophenyl)porphyrin in the presence of $H_2O_2$ under the conditions described in Patent FR 89 16690, published under No. 2,655,774.

Test 8 is carried out like Test 7 but the complex of Fe(III) with mesotetra(para-sulphonatophenyl)porphyrin is supported on an Amberlite of the same type as in Example 1.

Test 9 is identical to Test 8, except only in that trichlorophenol (TCP) is oxidized after a third use of the catalyst. The catalyst is recovered between each use by simple filtration at the end of the reaction, as is done in Example 2-2.

Test 10 is distinguished from test 9 in that oxidation takes place in the presence of potassium persulphate instead of hydrogen peroxide.

The main conditions and the results of the examples and comparative tests are collated in the table (I) below.

TABLE I

| Ex. | Substrate | Catalyst | % Cata/Substrate in moles | pH | Oxidizing agent | Conversion 1 min | Conversion 5 min | Conversion 60 min |
|---|---|---|---|---|---|---|---|---|
| 1 | TCP (1) | FePcS—Amb-1 | 1 | 7 | $H_2O_2$ | 65 | 80 | 93 |
| 2 | " | " | " | 3.7 | " | 63 | 93 | 99 |
| 2-1 | " | " | " | " | " | 70 | 92 | 97 |
| 2-2 | " | " | " | " | " | 69 | 88 | 95 |
| 3 | " | " | 1 | 5.5 | " | 13 | 28 | 45 |
| 4 | " | MnPcS—Amb | 1 | 7 | " | 38 | 45 | 63 |
| 5 | " | FePcS—Amb-1 | 1 | 2 | $KHSO_3$ | 43 | 71 | 98 |
| 6 | " | " | 1 | 7 | " | 44 | 80 | 90 |
| 6-1 | " | " | " | " | " | 13 | 20 | 35 |
| 7 | BZP (2) | FePcS—Amb-2 | " | " | $H_2O_2$ | 12 | 14 | 24 |
| 8 | " | " | " | 3.7 | " | 15 | 19 | 26 |
| 9 | " | " | 1 | " | $KHSO_3$ |  | 7 | 76 |
| 20 | PCP (3) | " | " | " | $H_2O_2$ | 27 | 36 | 65 |
| 11 | " | " | " | 3.7 | " | 57 | 67 | 88 |
| 12 | TCP | FePcS—Amb-1 | 10 | " | " | 33 | 64 | 88 |
| CT (4) |  |  |  |  |  |  |  |  |
| 1 | TCP | FePcS | 1 | 7 | $H_2O_2$ | 6 | 38 | 43 |
| 2 | " | FePc—PVP (2) | " | " | " | 41 | 53 | 59 |
| 3 | " | FePc—PVPMe⁺ (2) | " | " | " | 33 | 40 | 40 |
| 4 | " | MnPc—PVPMe⁺ (2) | " | " | " | 41 | 47 | 53 |
| 5 | " | CoPcS | " | 7 | " |  |  | 0 |
| 6 | " | MnPcS | " | 8.5 | " | 8 | 25 | 25 |
| 7 | " | FeTPPS (5) | 1 | 7 | $H_2O_2$ | 8 | 40 | 48 |
| 8 | " | FeTPPS—Amb-1 | " | " | " | 6 | 12 | 16 |
| 9 | " | FeTPPS—Amb-1 | " | " | " | 2 | 4 | 5 |
| 10 | " | FeTPPS—Amb-1 | " | " | $KHSO_3$ | 3 | 6 | 8 |

(1) TCP denotes 2,4,6-trichlorophenol
(2) BZP denotes benzo[a]pyrene
(3) PCP denotes pentachlorophenol
(4) Comparative Test During Example 1 and Comparative Tests 1 and 2, the unconverted trichlorophenol was quantitatively determined after 1, 3, 5, 10, 20 and 30 minutes. The results obtained were used to trace the curves of the change in the degree of conversion of trichlorophenol as a function of time. These curves are represented in FIG. 1. It is found, on examination of the graph, that the use of FePcS supported on the styrenic cationic resin is reflected by a rate of oxidation of trichlorophenol greater than those obtained with free FePcS or with FePcS supported by polyvinylpyridine, contrary to what was obtained with metalloporphyrins. Comparison of Example 1 and Comparative Test 3 emphasizes the advantageous nature, for the catalytic activity of FePcS, of the use as support of cationic resins of polystyrene type with respect to the use of polyvinylpyridiniums.

On comparing Comparative Test 1 and Comparative Test 7, it is noticed that the metalloporphyrin FeTPPS has an activity in the homogeneous phase comparable with that of the metallophthalocyanine FePcS (48% conversion of TCP in 60 min with FeTPPS compared with 43% conversion with FePcS). On the other hand, the difference is large when these same catalysts are supported on Amberlite. Comparative Test 8 shows that the conversion of TCP with the supported catalyst FeTPPS-Amb-1 is only 16% in 60 min instead of 93% with FePcS-Amb-1 (Example 1). This difference is yet more marked in experiments in which the catalysts are recycled. Catalysts supported on Amberlite are recovered after reacting for two hours by filtration and reused in a new catalytic oxidation reaction with a new charge of TCP and of hydrogen peroxide. Whereas the conversion of TCP with the supported metallophthalocyanine FePcS-Amb-1 (Example 2-2) is 95% in 60 min (against 93% in the first catalytic reaction (Example 1)), the conversion of TCP is only 5% with the supported metalloporphyrin FeTPP-Amb-1 on the third recycling (Comparative Test 9). With potassium monopersulphate, the conversion of TCP after the third recycling is only 8% in 60 min (Comparative Test 10).

The very good behaviour of the iron metallophthalocyanine supported on Amberlite during recycling of the catalyst and the falling away of the catalytic activity of the iron porphyrin FeTPPS supported on the same Amberlite, probably due to the decomposition of this catalyst, are thus demonstrated.

EXAMPLE 13

The present example is concerned with showing that the oxidation of 2,4,6-trichlorophenol (or TCP), according to the invention, is reflected by complete degradation of the aromatic ring, with in particular the release of chloride ions.

Under the conditions of Example 2 of Table I, that is to say with the FePcS-Amb-1/$H_2O_2$ pairing, 2.1±0.1 chloride ions Cl⁻ are released after reacting for 1 hour. They were quantitatively determined according to the mercury thiocyanate method described by T. M. Florence and Y. J. Famar, Anal. Chim. Acta, vol. 54, p. 373, 1971.

Figure 2:
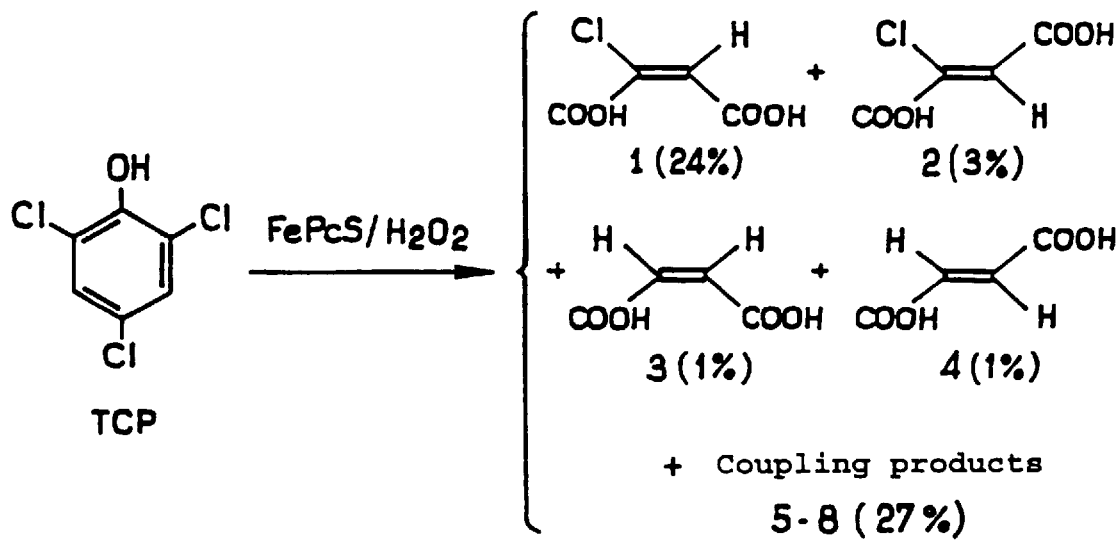
Figure 2:
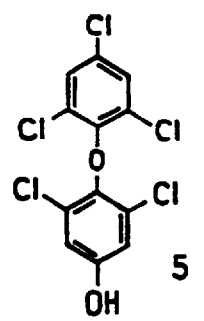
Figure 2:
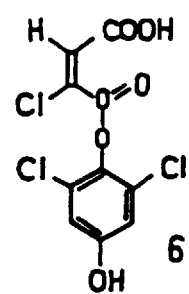
Figure 2:
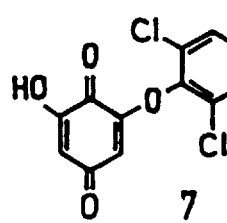
Figure 2:
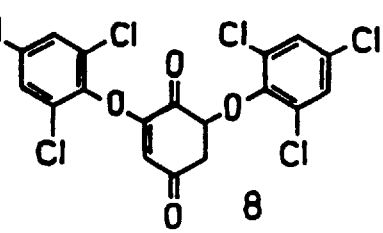

Under these conditions of Example 2, it was possible to identify eight products from the oxidation of TCP described in the appended FIGS. 2 and 3 (250 MHz proton NMR spectrum in $d_6$-DMSO, with $CHCl_3$ as internal standard). The first four compounds (1 to 4) are oxidation products corresponding to the opening of the aromatic ring (the main product being chloromaleic acid). The figures shown between brackets in FIG. 2 are the yields of isolated product. The other four products (5 to 8) are products from the coupling of TCP which takes place at the beginning of the reaction. The compound 6 is a product from the partial oxidation of the compound 5.

On replacing the catalyst FePcS by a porphyrin complex FeTPPS of French Patent No. 89 16690, published under No. 2,655,774, degradation of the aromatic ring is not obtained, the degradation product being limited to 2,6-dichloro-1,4-benzoquinone.

These results confirm the greater efficiency of the supported metallophthalocyanines in comparison with metalloporphyrins in the oxidation of pollutants using hydrogen peroxide.

We claim:

1. A process comprising oxidizing an organic compound having an oxidation/reduction potential greater than or equal to 1.45 volts (reference: Ag/AgCl) with a water-soluble peroxide oxidizing agent in the presence of a supported water-soluble metallophthalocyanine as a catalyst, wherein the catalyst is an iron or manganese phthalocyanine immobilized on an ionic resin, said resin comprising a crosslinked insoluble copolymer, and the peroxide oxidizing agent is selected from the group consisting of hydrogen peroxide and alkali metal persulphates, and wherein said copolymer is obtained by copolymerizing a vinyl aromatic monomer and at least one other vinyl aromatic monomer, and wherein said resin has been made ionic by introducing cationic or anionic groups thereto.

2. The process according to claim 1, wherein the ionic resin used as support for the phthalocyanine exhibits a plurality of repeat units of formula:

in which Z represents said cationic or anionic radical and $R_4$ a $C_1$–$C_4$ alkyl radical and p is 0, 1 or 2.

3. The process according to claim 2, wherein the ionic resin used as support for the phthalocyanine exhibits a plurality of repeat units of formula (II) in which Z represents a sulphonic acid group $SO_3H$ or a cationic group of general formula:

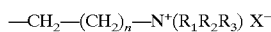

in which n is 0 or an integer from 1 to 4, $R_1$, $R_2$ and $R_3$ represent $C_1$–$C_4$ alkyl radicals and X represents a halogen atom.

4. The process according to claim 3, wherein the resin used as support contains a plurality of units of general formula:

in which $R_4$ and p have the meaning given for the formula (II), in combination with the units containing ionic groups.

5. The process according to claim 4, wherein the repeat units of formula (IV) are units obtained from polymerizing styrene or α-methylstyrene.

6. The process according to claim 1, wherein the resin has been crosslinked with divinylbenzene.

7. The process according to claim 1, wherein the resin used as support contains a number of repeat units containing ionic groups calculated in order to introduce from 1 to 10 milliequivalents of ionic groups per gram of dry resin and from 0.1 to 25 mol % of crosslinking units with respect to the total of the repeat units.

8. The process according to claim 1, wherein the resin used as support is in the form of particles with a mean diameter within a range from 80 to 1000 μm.

9. The process according to claim 1, wherein the water-soluble iron or manganese phthalocyanine is a metallophthalocyanines corresponding to the general formulae:

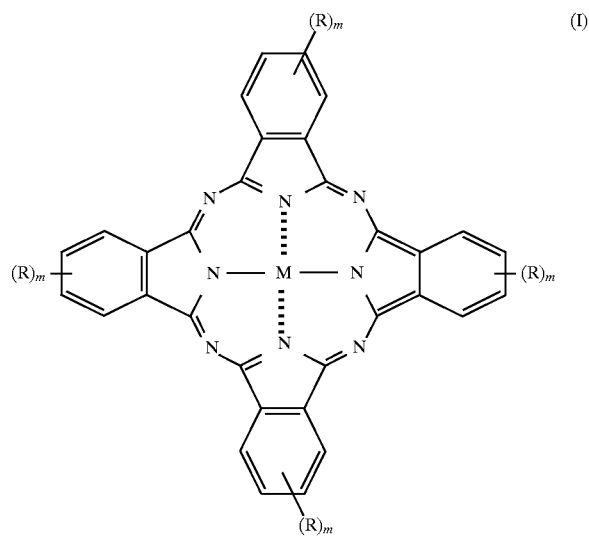

in which:
M represents an iron or manganese atom;
R represents:
  (a) a sulphonic acid group (—$SO_3H$);
  (b) a quaternary ammonium group of general formula —$CH_2$—$(CH_2)_n$$N^+$($R_1R_2R_3$) $X^-$, in which: n is 0 or an integer of from 1 to 4; $R_1$, $R_2$ and $R_3$ represent $C_1$–$C_4$ alkyl radicals; and X represents a halogen atom;
  (c) a pyridinium radical;
  (d) a lower alkyl group;
  (e) an aromatic group,
m is 0 or an integer from 1 to 4, with the restriction that at least one of the m indices is equal to 1 and that at least one of the R substituents represents one of the above-mentioned (a), (b) or (c),
and by the iron or cobalt phthalocyanines obtained from quaternized tetraazaphthalocyanines.

10. The process according to claim 9, wherein the metallophthalocyanine is iron or manganese 4,4',4'',4'''-tetrasulphophthalocyanine.

11. The process according to claim 1, wherein the amount of catalyst used is calculated so that the percentage in moles of the metallophthalocyanine with respect to the substrate to be oxidized is within a range from 0.01 to 5.

12. The process according to claim 1, wherein the organic compound is selected from the group consisting of polycyclic aromatic hydrocarbons, halogenated mono- and polycyclic aromatic hydrocarbons, haloalkanes and cycloalkanes, halogenated arylaliphatic hydrocarbons and halophenols.

13. The process according to claim 12, wherein the compound subjected to oxidation is taken from the group consisting of pyrene, benzo[a]pyrene, anthracene, phenanthrene, benzanthracene, biphenyl, 1,1-bis(4-chlorophenyl)-2,2,2-trichloroethane, 1,2,3,4,5,6-hexachlorocyclohexane, 3,4,3',4'-tetrachlorobiphenyl, 2,4,5,2',4',5'-hexachlorobiphenyl, 2,4-dichlorophenol, 2,4,5-trichlorophenol, 2,4,6-trichlorophenol, pentachlorophenol, 4,5-dichloroguaiacol and 4,5,6-trichloroguaiacol.

14. The process according to claim 1, wherein the reaction is carried out at a temperature within a range from 10° to 100° C.

15. The process according to claim 1, wherein the peroxide oxidizing agent is hydrogen peroxide.

* * * * *